(12) United States Patent
Shin

(10) Patent No.: US 9,055,209 B2
(45) Date of Patent: Jun. 9, 2015

(54) METHOD TO PROVIDE USER INTERFACE TO DISPLAY MENU RELATED TO IMAGE TO BE PHOTOGRAPHED, AND PHOTOGRAPHING APPARATUS APPLYING THE SAME

(75) Inventor: Chang-beom Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 667 days.

(21) Appl. No.: 12/265,114

(22) Filed: Nov. 5, 2008

(65) Prior Publication Data

US 2009/0265664 A1  Oct. 22, 2009

(30) Foreign Application Priority Data

Apr. 22, 2008  (KR) .................................. 2008-37264

(51) Int. Cl.
    G06F 3/048    (2013.01)
    H04N 5/232    (2006.01)

(52) U.S. Cl.
    CPC ........... *H04N 5/232* (2013.01); *H04N 5/23216* (2013.01)

(58) Field of Classification Search
    CPC .............. H04N 5/23216; H04N 5/232; G06K 9/00664; G06K 17/30265; G06K 9/00711
    USPC ......................................... 348/348; 382/224
    See application file for complete search history.

(56) References Cited

U.S. PATENT DOCUMENTS

| | | | |
|---|---|---|---|
| 5,270,806 A * | 12/1993 | Venable et al. ............... | 358/500 |
| 5,745,116 A | 4/1998 | Pisutha-Arnond | |
| 5,861,871 A * | 1/1999 | Venable ......................... | 708/200 |
| 5,898,436 A * | 4/1999 | Stewart et al. ................ | 345/594 |
| 6,310,648 B1 * | 10/2001 | Miller et al. .............. | 348/333.05 |
| 6,919,927 B1 * | 7/2005 | Hyodo ...................... | 348/333.02 |
| 7,212,234 B2 | 5/2007 | Sakaguchi et al. | |
| 7,522,195 B2 * | 4/2009 | Yamamoto et al. ......... | 348/231.2 |
| 7,593,603 B1 * | 9/2009 | Wilensky ...................... | 382/311 |
| 7,646,400 B2 * | 1/2010 | Liow et al. ...................... | 348/36 |
| 7,777,747 B1 * | 8/2010 | Krenz .......................... | 345/501 |
| 7,782,384 B2 * | 8/2010 | Kelly ....................... | 348/333.01 |
| 7,954,067 B2 * | 5/2011 | Breglio ......................... | 715/810 |
| 8,212,780 B2 * | 7/2012 | Mashimo ...................... | 345/173 |
| 2001/0052937 A1 * | 12/2001 | Suzuki .......................... | 348/239 |
| 2002/0015064 A1 | 2/2002 | Robotham et al. | |
| 2003/0090528 A1 * | 5/2003 | Masuda et al. ................ | 345/838 |
| 2005/0190264 A1 * | 9/2005 | Neal ........................... | 348/207.1 |
| 2005/0193351 A1 * | 9/2005 | Huoviala ....................... | 715/815 |
| 2006/0066628 A1 * | 3/2006 | Brodie et al. ................. | 345/594 |
| 2006/0072028 A1 * | 4/2006 | Hong ........................ | 348/333.01 |
| 2006/0077185 A1 * | 4/2006 | Mashimo ...................... | 345/173 |
| 2006/0098112 A1 * | 5/2006 | Kelly ....................... | 348/333.12 |

(Continued)

FOREIGN PATENT DOCUMENTS

| KR | 1020050042852 A | 5/2005 |
|---|---|---|
| KR | 20060019362 | 3/2006 |

OTHER PUBLICATIONS

International Search Report issued Dec. 26, 2008 in PCT/KR2008/005760.

*Primary Examiner* — Anil Bhargava
(74) *Attorney, Agent, or Firm* — Sughrue Mion, PLLC

(57) ABSTRACT

A method to provide a user interface (UI) includes the UI, the present general inventive concept provides the UI to specify a certain region of an image to be photographed and to display a menu for an image displayed on a specified region.

25 Claims, 16 Drawing Sheets

(56) References Cited

U.S. PATENT DOCUMENTS

| | | |
|---|---|---|
| 2006/0197753 A1 | 9/2006 | Hotelling |
| 2007/0008300 A1* | 1/2007 | Yang et al. .................... 345/173 |
| 2007/0150826 A1* | 6/2007 | Anzures et al. ............... 715/772 |
| 2007/0172155 A1* | 7/2007 | Guckenberger ............... 382/305 |
| 2007/0188628 A1* | 8/2007 | Yamamoto et al. ........ 348/231.1 |
| 2007/0195174 A1* | 8/2007 | Oren ........................... 348/222.1 |
| 2007/0291338 A1* | 12/2007 | Williams et al. .............. 358/537 |
| 2008/0052627 A1* | 2/2008 | Oguchi ......................... 715/733 |
| 2008/0130992 A1* | 6/2008 | Fujii ............................. 382/167 |
| 2008/0252753 A1* | 10/2008 | Ejima et al. ............... 348/231.99 |
| 2009/0009652 A1* | 1/2009 | Sudo et al. .................... 348/349 |
| 2009/0027652 A1 | 1/2009 | Chang et al. |
| 2009/0037605 A1* | 2/2009 | Li .................................. 709/246 |
| 2009/0046075 A1* | 2/2009 | Kim et al. ..................... 345/173 |
| 2009/0153288 A1 | 6/2009 | Hope et al. |
| 2009/0256947 A1* | 10/2009 | Ciurea et al. ............. 348/333.12 |
| 2009/0319897 A1* | 12/2009 | Kotler et al. .................. 715/711 |
| 2010/0130250 A1* | 5/2010 | Choi .......................... 455/556.1 |
| 2010/0220220 A1* | 9/2010 | Park et al. .................. 348/240.2 |
| 2010/0284675 A1* | 11/2010 | Machida et al. .............. 396/106 |
| 2011/0085784 A1* | 4/2011 | Imamura ......................... 396/55 |

* cited by examiner

METHOD TO PROVIDE USER INTERFACE TO DISPLAY MENU RELATED TO IMAGE TO BE PHOTOGRAPHED, AND PHOTOGRAPHING APPARATUS APPLYING THE SAME

CROSS-REFERENCE TO RELATED APPLICATIONS

This application claims priority under 35 U.S.C. §119 (a) from Korean Patent Application No. 10-2008-0037264, filed on Apr. 22, 2008, in the Korean Intellectual Property Office, the disclosure of which is incorporated herein by reference in its entirety.

BACKGROUND OF THE INVENTION

1. Field of the Invention

The present general inventive concept relates to a method to provide a user interface (UI) and a photographing apparatus applying the same. More particularly, the present general inventive concept relates to a method to provide a user interface (UI) related to photographic techniques and a photographing apparatus applying the same.

2. Description of the Related Art

Recently, digital cameras have come to be used by most camera users. In contrast to film cameras, a digital camera does not require film so there is no burden when taking numerous photos. Therefore, in general, a user may photograph the same object several times to select the most desirable photo.

Also, as digital single lens reflex cameras (digital SLRs or DSLRs) have spread among general users, the general users increasingly wish to take higher quality photos.

However, users must have a basic knowledge of the camera in order to become skillful in photographic techniques of the camera. Additionally, users should become acquainted with terms related to the photographic techniques of the camera.

Furthermore, in order to take high quality photos, users should take numerous photos and then review the taken photos in order to select the most desirable photo.

As described above, in order to take high quality photos, the users need to learn about the photographic techniques of a camera, to become acquainted with terms related to the photographic techniques of the camera, and to check numerous photos taken.

In using a camera, users wish to more easily take high quality photos. Therefore, there is demand for a camera with which users can photograph high quality photos more easily.

SUMMARY OF THE INVENTION

The present general inventive concept provides a method to provide a user interface (UI) to display a menu for images in a specified region and a photographing apparatus applying the same, in order that a user can take high quality photos more easily.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method to provide a user interface (UI). The method includes displaying an image to be photographed, specifying a certain region of the displayed image, and displaying a menu listing image effects related to an image displayed on the specified region.

The method may further include determining a type of image displayed on the specified region, and setting menu items according to the type of image determined to be displayed.

The type of image displayed on the specified region may be at least one of an image of a person or an image of lights.

And, the menu may be related to image effects corresponding to specific photographic techniques.

The menu may display functions in user-friendly language describing effects on the image of using the specific photographic techniques.

The displaying may display the menu before the image is photographed.

The specifying may include receiving a user's touch through a touch screen, and determining the specific region based on information on a position where the user touches the touch screen.

The specifying may include determining a focused region to be the specific region of the image to be photographed.

The specifying may determine a region on which an image related to a preset photographic mode is displayed to be the specified region of the displayed image.

When a user touches the touch screen on which the image to be photographed is displayed, the displaying may display the menu on an edge of the region touched.

When the type of image displayed on the specified region cannot be determined, the displaying may display a menu for image effects related to the entire displayed image.

The foregoing and/or other aspects and utilities of the present general inventive concept may also be achieved by providing a photographing apparatus. The photographing apparatus includes a display unit to display an image to be photographed, and a control unit to specify a certain region of the displayed image and to control a menu for image effects related to the image displayed on the specified region to be displayed on the display unit.

The control unit may determine a type of image displayed on the specified region and set menu items according to the type of image determined to be displayed.

The type of image displayed on the specified region may be at least one of an image of a person or an image of lights.

The menu may be a menu for image effects corresponding to specific photographic techniques.

The menu may display functions in user-friendly language describing image effects of using specific photographic techniques.

The control unit may control the menu to be displayed before the image is photographed.

The display unit may be provided with a touch screen to receive a user's touch, and the control unit may determine the specified region based on information on a position where the user touches the touch screen.

The control unit may determine a focused region to be the specified region of the image to be photographed.

The control unit may determine a region on which an image related to a preset photographic mode is displayed to be the specified region of the displayed image.

When a user touches the touch screen displayed on which the image to be photographed is displayed, the control unit controls the menu to be displayed on an edge of the region touched.

When the type of image displayed on the specified region cannot be determined, the control unit controls a menu for image effects related to the entire displayed image to be displayed.

The foregoing and/or other aspects and utilities of the present general inventive concept may also be achieved by providing a method to provide a user interface (UI). The method includes setting a photographic mode, determining a type of image to correspond to the set photographic mode, and setting menu items for image effects related to the type of image determined.

The foregoing and/or other aspects and utilities of the general inventive concept may also be achieved by providing a photographing apparatus including a display unit to display an image to be photographed, and a control unit to determine a type of the image, and to set menu items corresponding to the type of the image.

The foregoing and/or other aspects and utilities of the general inventive concept may also be achieved by providing a photographing method including displaying an image to be photographed, determining a type of the image, and setting menu items corresponding to the type of the image.

The foregoing and/or other aspects and utilities of the general inventive concept may also be achieved by providing a computer-readable recording medium having embodied thereon a computer program to execute a method, wherein the method including displaying an image to be photographed, determining a type of the image, and setting menu items corresponding to the type of the image.

BRIEF DESCRIPTION OF THE DRAWINGS

These and/or other aspects and utilities of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
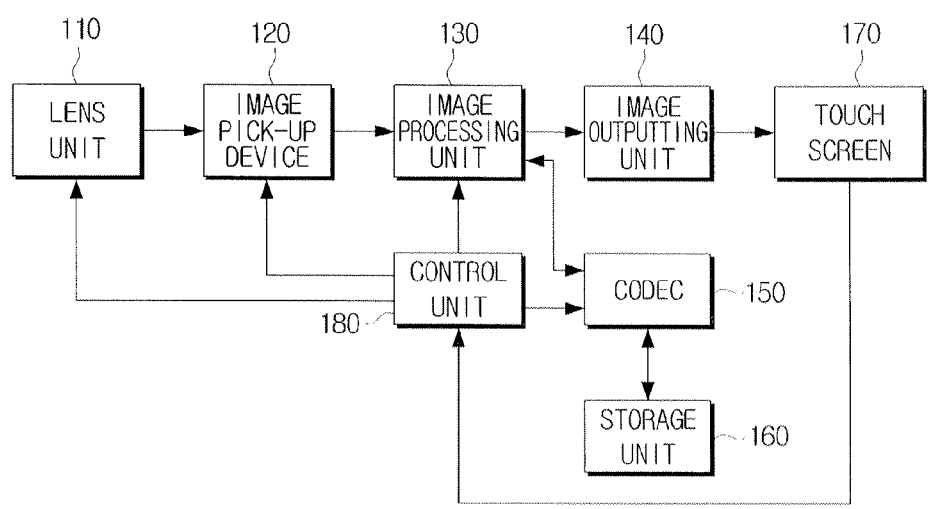
FIG. 1 is a block diagram illustrating a digital camera to which an exemplary embodiment of the present general inventive concept can be applied.

Reference will now be made in detail to embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating an apparatus to which an exemplary embodiment of the present general inventive concept can be applied. As illustrated in FIG. 1, the apparatus is a digital camera including a lens unit 110, an image pick-up device 120, an image processing unit 130, an image outputting unit 140, a codec 150, a storage unit 160, a touch screen 170, and a control unit 180. The apparatus may be a computer mounted with a digital camera. In this case, at least one of the lens unit 110 and the image pickup unit 120 is disposed in the digital camera, and other units can be disposed in the computer.

The lens unit 110 collects light to allow an optical image to focus on an image pick-up region.

The image pick-up device 120 photoelectrically converts light incident through a lens into electrical signals and performs signal processing on the electrical signals. The image pick-up device 120 performing such a function includes an image sensor and an AD converter. The image sensor outputs image signals in analog form, and the AD convert converts and outputs the image signals in digital form.

The image processing unit 130 performs signal processing on images input from the image pick-up device 120 and transmits the processed image signals to display photographed images to the image outputting unit 140. The image processing unit 130 also outputs the processed image signals to the codec 150 in order to store the photographed images.

More specifically, the image processing unit 130 performs functions including digital zoom, auto white balance (AWB), auto focus (AF), and auto exposure (AE), etc., in order to control format conversion and image scaling of the image signals output from the image pick-up device 120.

The image outputting unit 140 outputs the image signals received from the image processing unit 130 to the touch screen 170, which may be an internal display apparatus or an external outputting terminal.

The codec 150 encodes the image signals received from the image processing unit 130, and transmits the encoded image signals to the storage unit 160. The codec 150 also decodes the encoded image signals stored in the storage unit 160, and transmits the decoded image signals to the image processing unit 130.

That is, the codec 150 encodes the image signals when storing the photographed image, and decodes the image signals when outputting the stored image to the image processing unit 130.

The storage unit 160 stores the photographed image in the image pick-up device 120 in a compressed form. The storage unit 160 may be a flash memory, a hard disk, a DVD, etc.

The touch screen 170 displays an image to be photographed, and receives a user's touch and transmits the input touch to the control unit 180.

The control unit 180 controls an entire operation of the photographing apparatus. More specifically, the control unit 180 controls the image processing unit 130 to perform signal processing on the photographed image. The control unit 180 also controls the codec 150 to encode or decode the image signals, generates a graphical user interface (GUI) and adds the generated GUI to an image to be displayed on the touch screen 170, The controller 180 specifies a certain region of the image displayed on the touch screen 170 and controls a menu for the image displayed on the specified region (hereinafter, referred to as the 'specified region menu') to be displayed on the touch screen.

Herein, the specified region is a region selected in order to provide or emphasize certain effects. The control unit 180 determines the specified region based on position information on where a user touches the touch screen 170. However, the control unit 180 may determine the specified region to be a focused region or a region on which an image related to a particular photographic mode is displayed as well as the region to which a user's touch inputs, The specified region menu is a menu to select effects for a portion of the image displayed on the specified region or effects for a portion of the image other than the portion displayed on the specified region. For example, the specified region menu may include items to make the portion of the image displayed on the specified region bright or dark, or to make the area around the portion of the image displayed on the specified region clear or dim.

The control unit 180 determines a type of image displayed on the specified region, and sets menu items for the specified region accordingly. The type of image may be, for example, an image of a person, an image of lights, or an image of a waterdrop, etc.

The image of the person refers to a portion of the image to be photographed on which a person is displayed. The person's characteristics are specified using the person's face. Therefore, in the image of the person, the person's face becomes the center.

The control unit 180 recognizes the person's face using facial recognition technology. Examples of the facial recognition technology include, but are not limited to, a color-based method, an edge-based method, and a support vector machine (SVM)-based method, etc. Detailed description of the facial recognition technology will be omitted.

The image of lights refers to a portion of the image to be photographed on which lights are displayed. The portion on which lights are displayed is brighter than a surrounding background. Therefore, the control unit 180 recognizes the image of lights using light recognition technology, which recognizes lights by recognizing a contrast ratio between a surrounding environment and an object. The control unit 180 determines the type of image displayed on the specified region using various other methods, and sets menu items for the specified region menu accordingly.

The specified region menu is a menu related to photographic techniques. The menu items of the specified region menu are displayed in user-friendly language. Herein, the user-friendly language refers to an expression describing effects on the image of using specific photographic techniques.

For example, when the menu item selected from the specified region menu is "lighter face", a function of a corresponding item refers to a setting of photographic techniques to make a person's face brighter. Therefore, if a user selects a menu item "lighter face", the control unit 180 slows the shutter speed and raises the exposure correction value in order that a face is brightly taken. That is, "lighter face" in use language corresponds to "slow shutter speed and raise exposure correction value" in technical language.

If the specified region menu is displayed in user-friendly language, the user can easily comprehend the functions of each item of the specified region menu, as described above.

Herein, the user selects an item from the specified region menu, the control unit 180 sets photographic techniques of a digital camera so that image effects corresponding to the selected menu item can be represented.

Herein, the photographic techniques refer to setting of the setting values of the camera to be set in order for the user to photograph his desired photo before he photographs the photo. The setting values related to photographic techniques include setting values such as aperture, shutter speed, exposure correction, color temperature, and focal length, etc. Besides, all setting values affecting an image to be photographed are included in the setting values related to the photographic techniques.

That is, if the user selects a menu item from the specified region menu, the control unit 180 controls the lens unit 110 or the image pick-up device 120 to illustrate effects of the selected menu item before an image is photographed.

The control unit 180 thus controls the specified region menu to be displayed before an image to be photographed is photographed.

When a touch is input on the touch screen 170, the control unit 180 controls the specified region menu to be displayed on the edge of the region where the touch is input.

When the type of image displayed on the specified region cannot be determined, the control unit 180 controls a menu for the entire displayed image to be displayed. For example, the control unit 180 may display a menu including items such as "brighter" and "darker" for the entire image.

Figure 2:
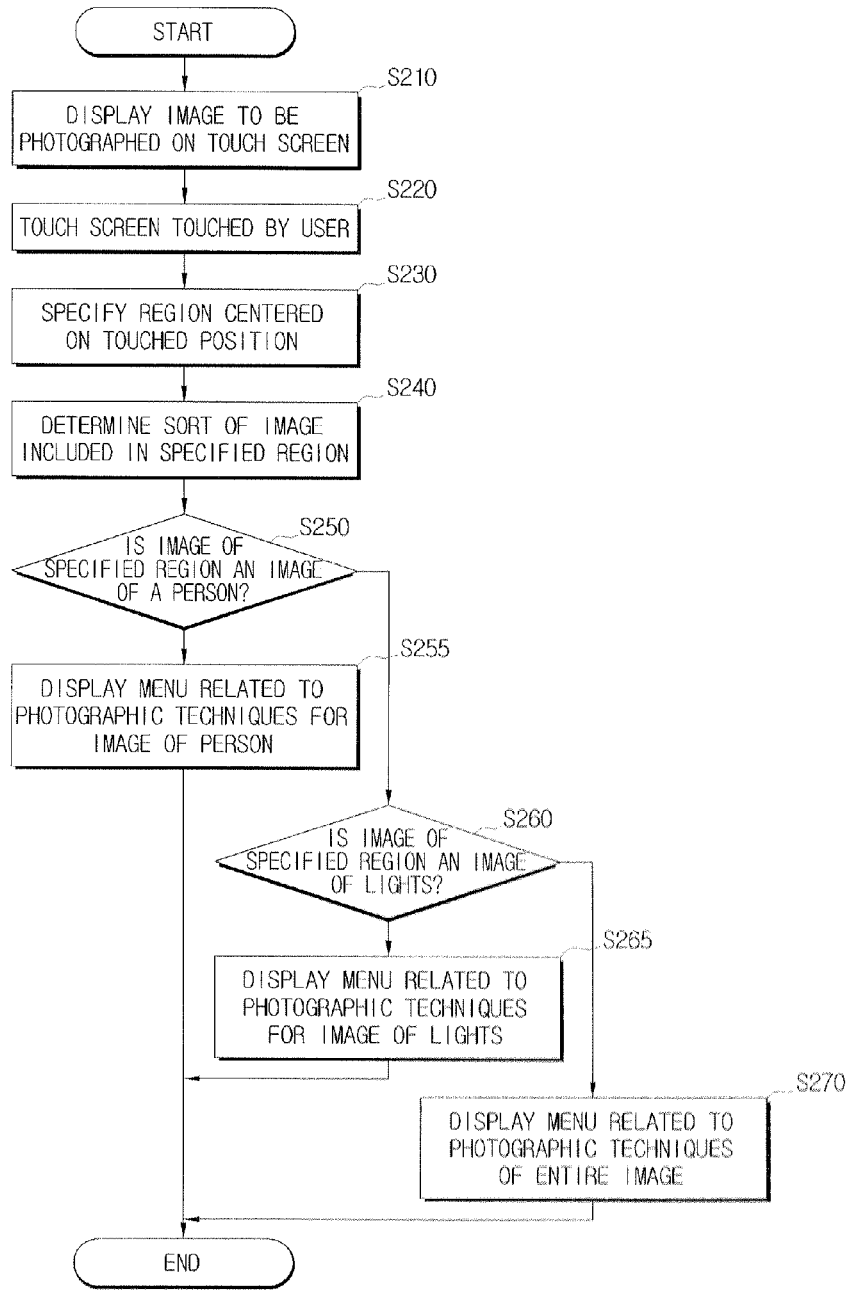
FIG. 2 is a flow chart illustrating a method to provide a user interface to display a menu for an image on a specified region according to an exemplary embodiment of present general inventive concept.

Hereinafter, an operation of a digital camera will be described in detail with reference to FIGS. 1 and 2. FIG. 2 is a flow chart illustrating a method to provide a user interface to display a menu for an image on a specified region according to an exemplary embodiment of present general inventive concept.

A digital camera displays an image to be photographed on a touch screen 170 (operation S210). When a user touches the touch screen 170 (operation S220), the digital camera specifies a certain region of the displayed image centered on the touched position (operation S230). The digital camera determines a specified region based on position information where the user touches the touch screen 170. However, the digital camera may also determine the specified region to be a focused region and a region on which an image related to a photographic mode is displayed, as well as the region to which the user's touch is input.

A process to specify a region of the displayed image will be described in detail later with reference to FIGS. 4 to 8.

The digital camera subsequently determines the type of image included in the specified region (operation S240). The type of image may be, for example, an image of a person, an image of lights, or an image of waterdrop, etc.

Figure 9:
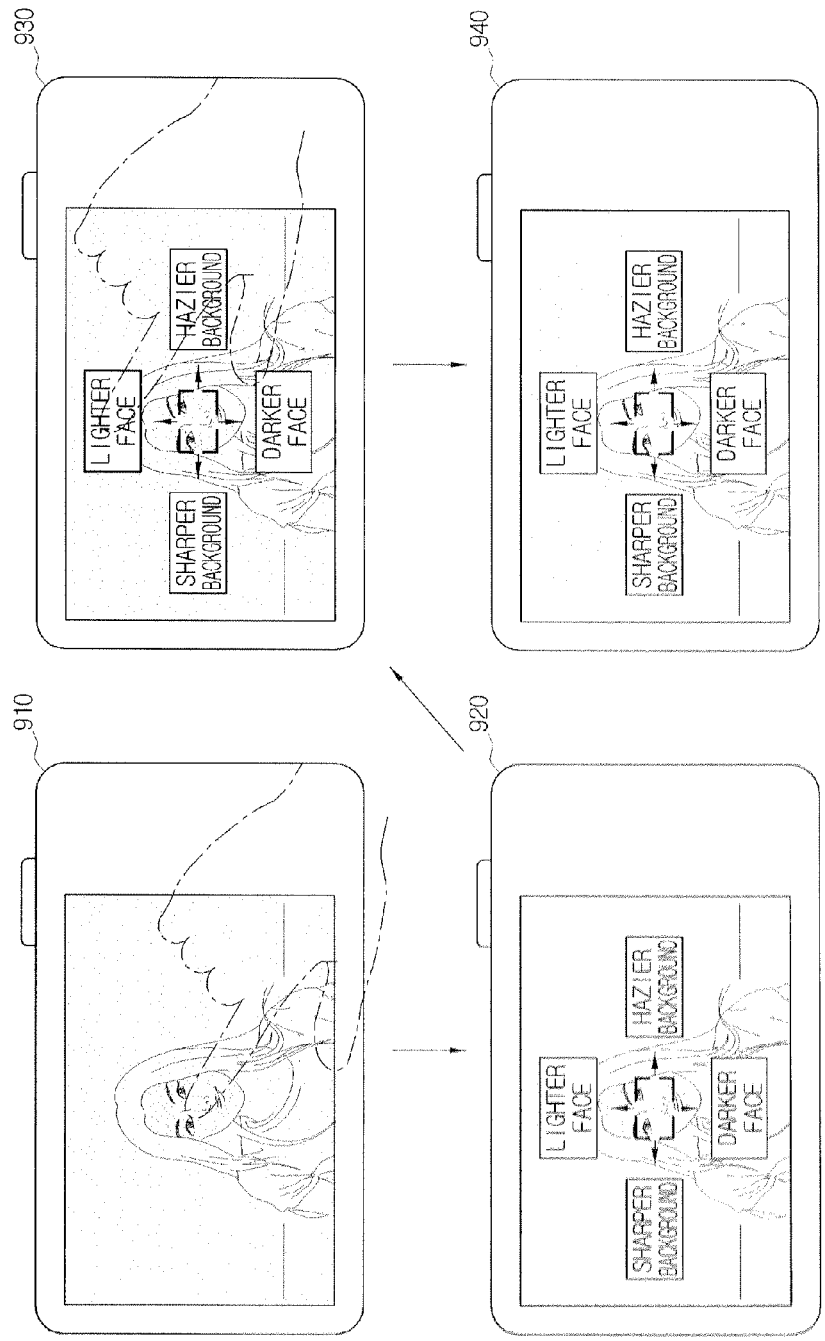
FIG. 9 is a view illustrating a process to select an item "lighter face" according to an exemplary embodiment of present general inventive concept.
Figure 10:
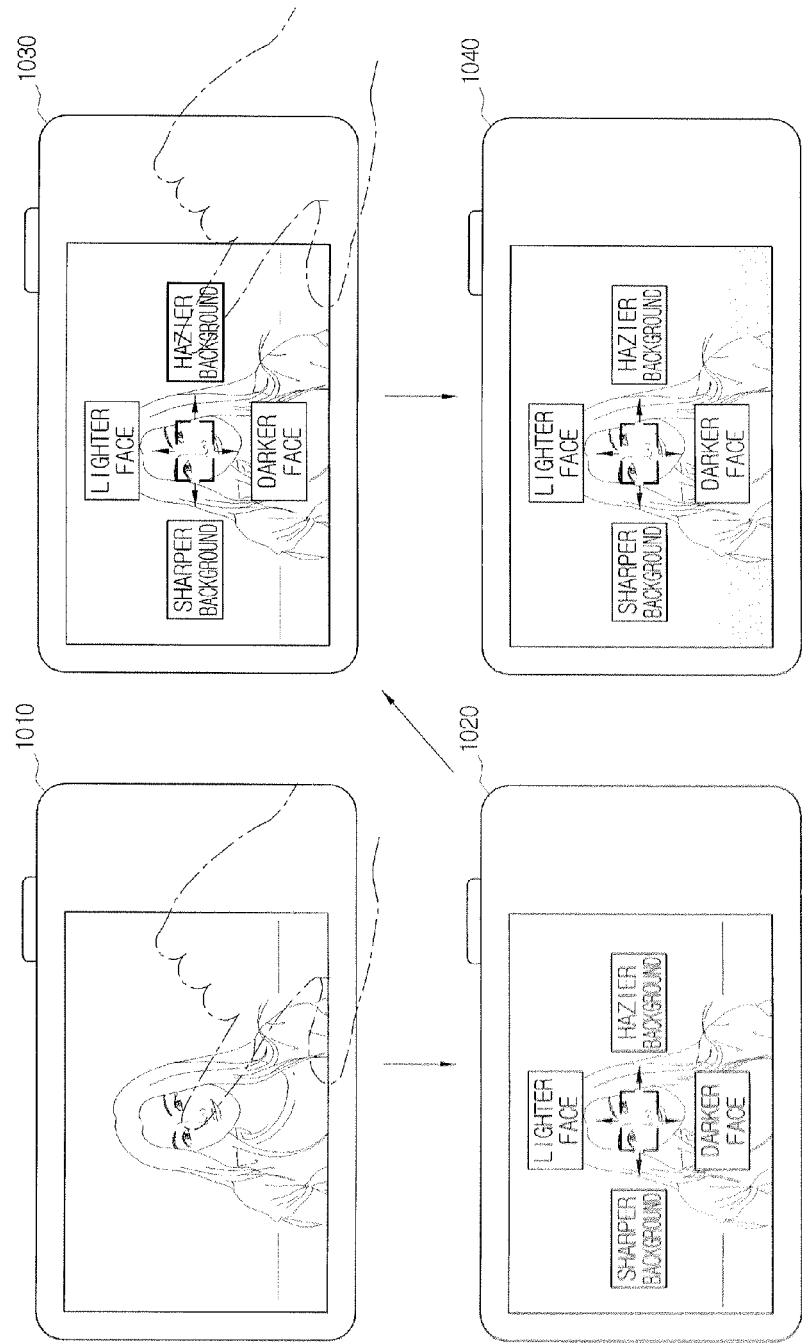
FIG. 10 is a view illustrating a process to select an item "hazier background" according to an exemplary embodiment of present general inventive concept.

When the image on the specified region is an image of a person (operation S250-Y), a menu related to photographic techniques for an image of a person is displayed (operation S255). For example, when the image on the specified region is an image of a person, the specified region menu includes menu items such as "lighter face", "darker face", "sharper background", and "hazier background". A screen illustrating the case when the image on the specified region is a person is illustrated in FIGS. 9 and 10.

Figure 11:
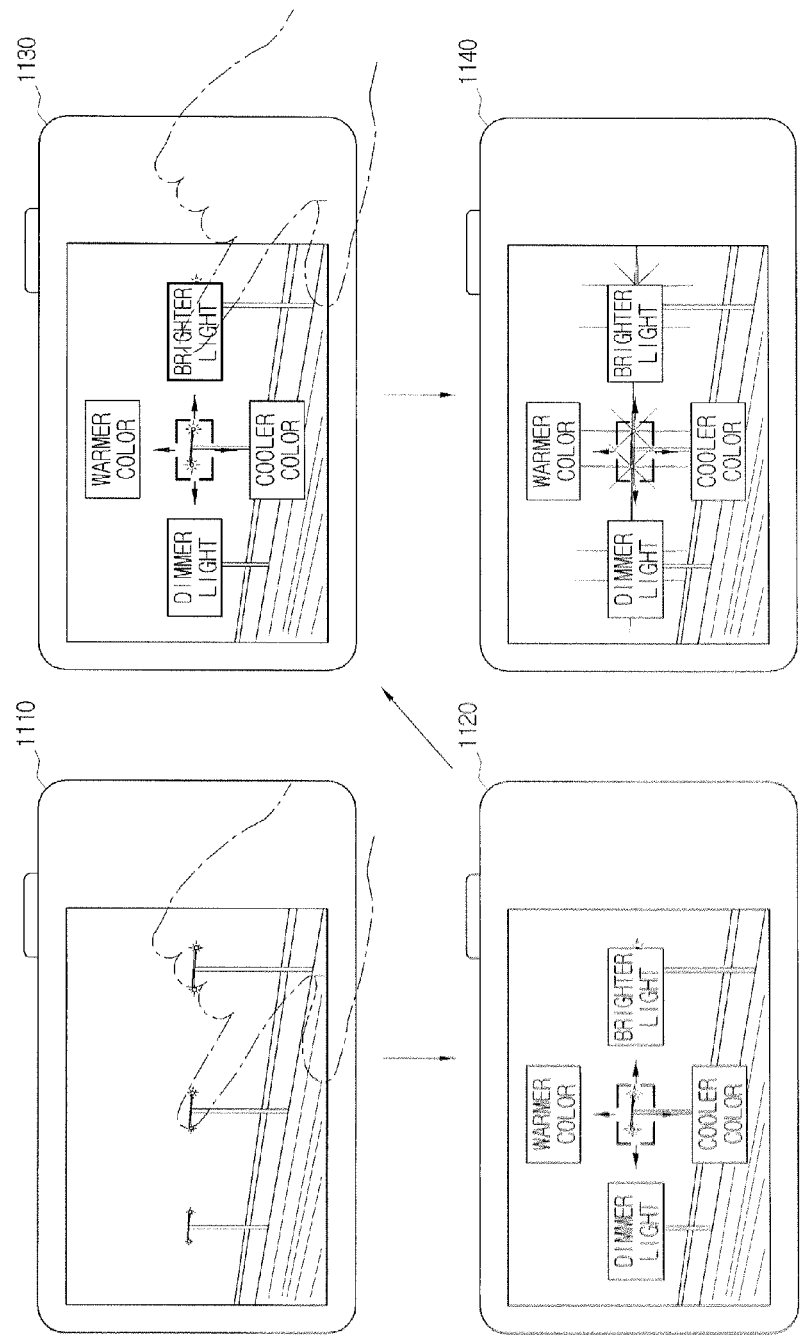
FIG. 11 is a view illustrating a process to select an item "brighter light" according to an exemplary embodiment of present general inventive concept.
Figure 12:
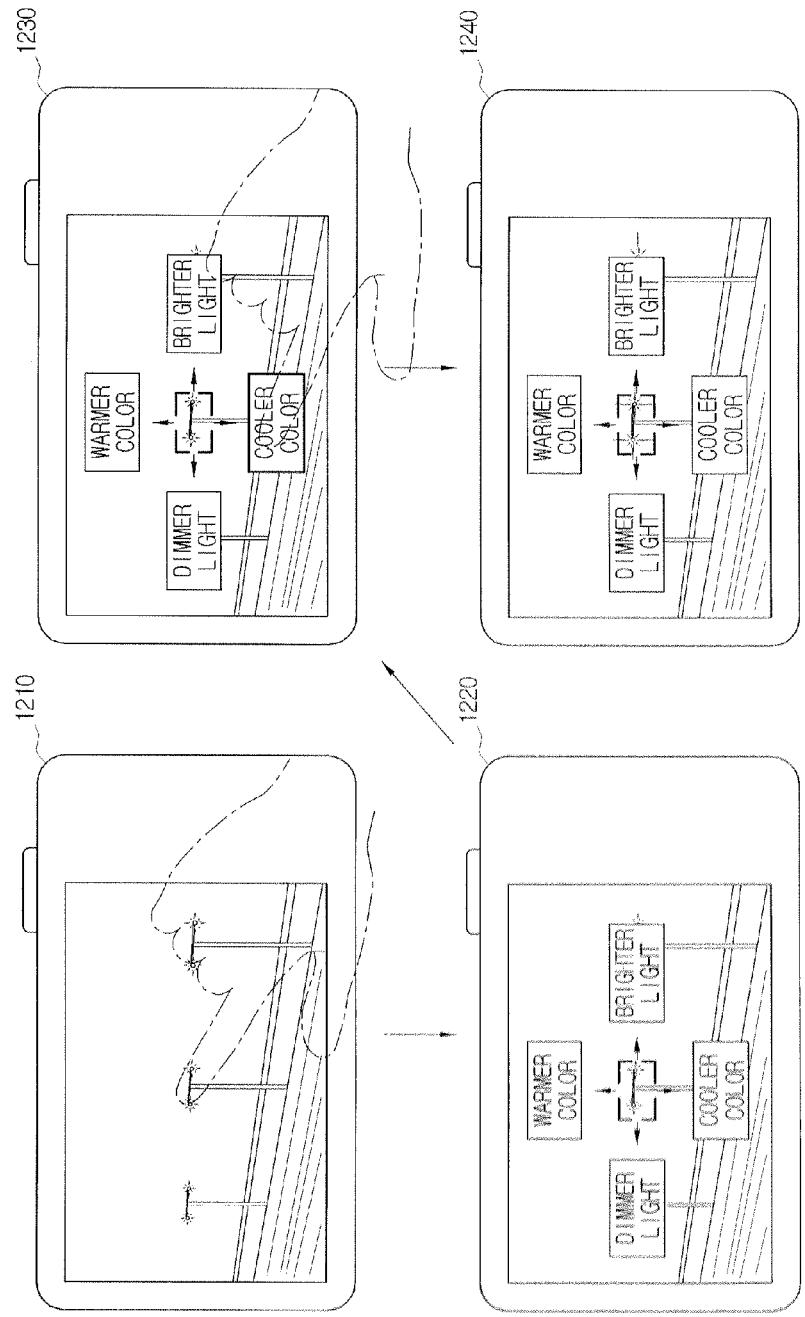
FIG. 12 is a view illustrating a process to select an item "cooler color" according to an exemplary embodiment of present general inventive concept.

When the image on the specified region is an image of lights (operation S260-Y), a menu related to photographic techniques related to images of lights is displayed (operation S265). For example, when the image on the specified region is an image of lights, the specified region menu includes items such as "warmer color", "cooler color", "dimmer light", and "brighter light". A screen illustrating the case when the image on the specified region is an image of lights is illustrated in FIGS. 11 and 12.

Figure 14:
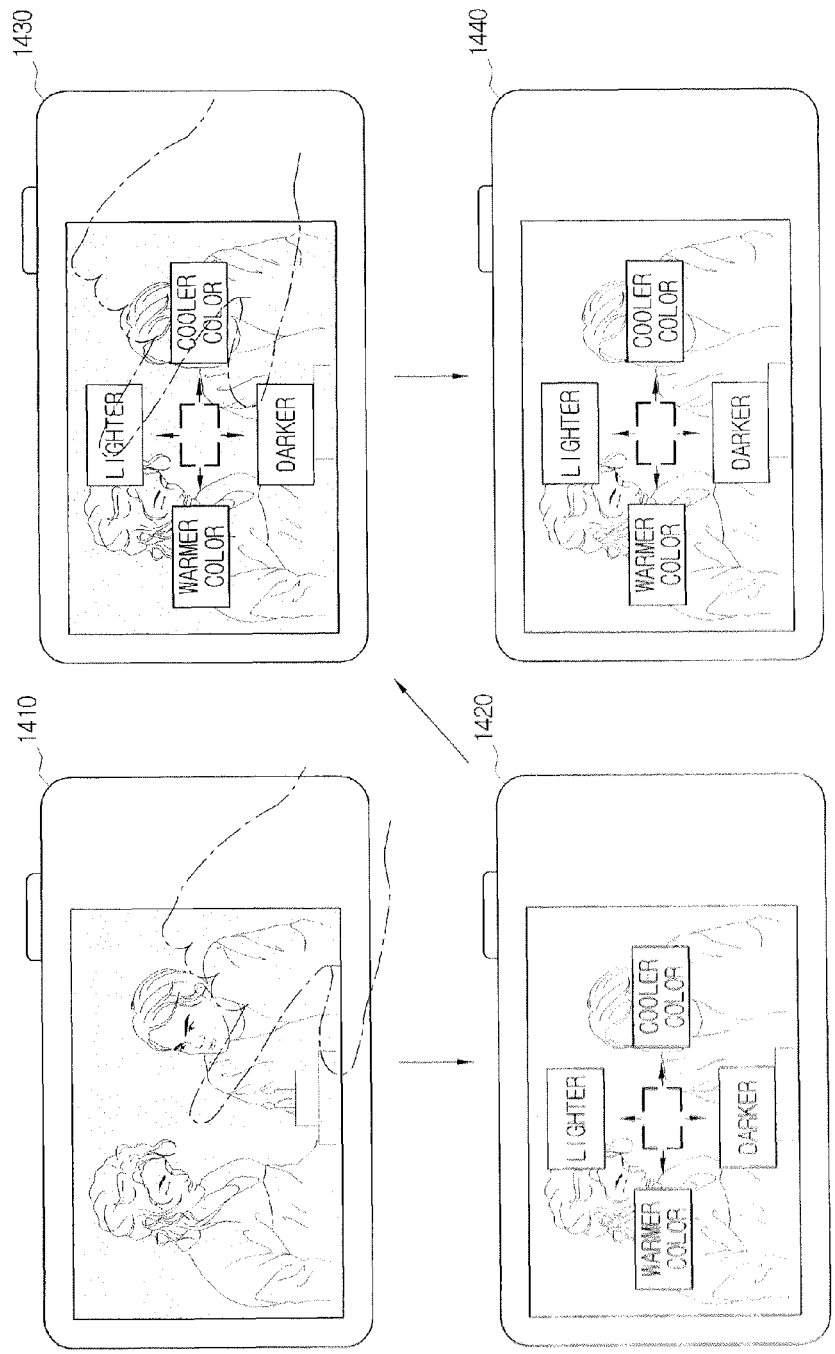
FIG. 14 is a view illustrating a process to select an item "lighter" according to an exemplary embodiment of present general inventive concept.

Meanwhile, when the image on the specified region is neither an image of a person nor a image of lights (operation S260-N), a menu related to photographic techniques of an entire image is displayed (operation S270). For example, the menu related to the photographic techniques for the entire image includes "lighter", "darker", "warmer color", and "cooler color". This feature is illustrated in FIG. 14.

The digital camera is able to provide the specified region menu through the process as described above.

Figure 3:
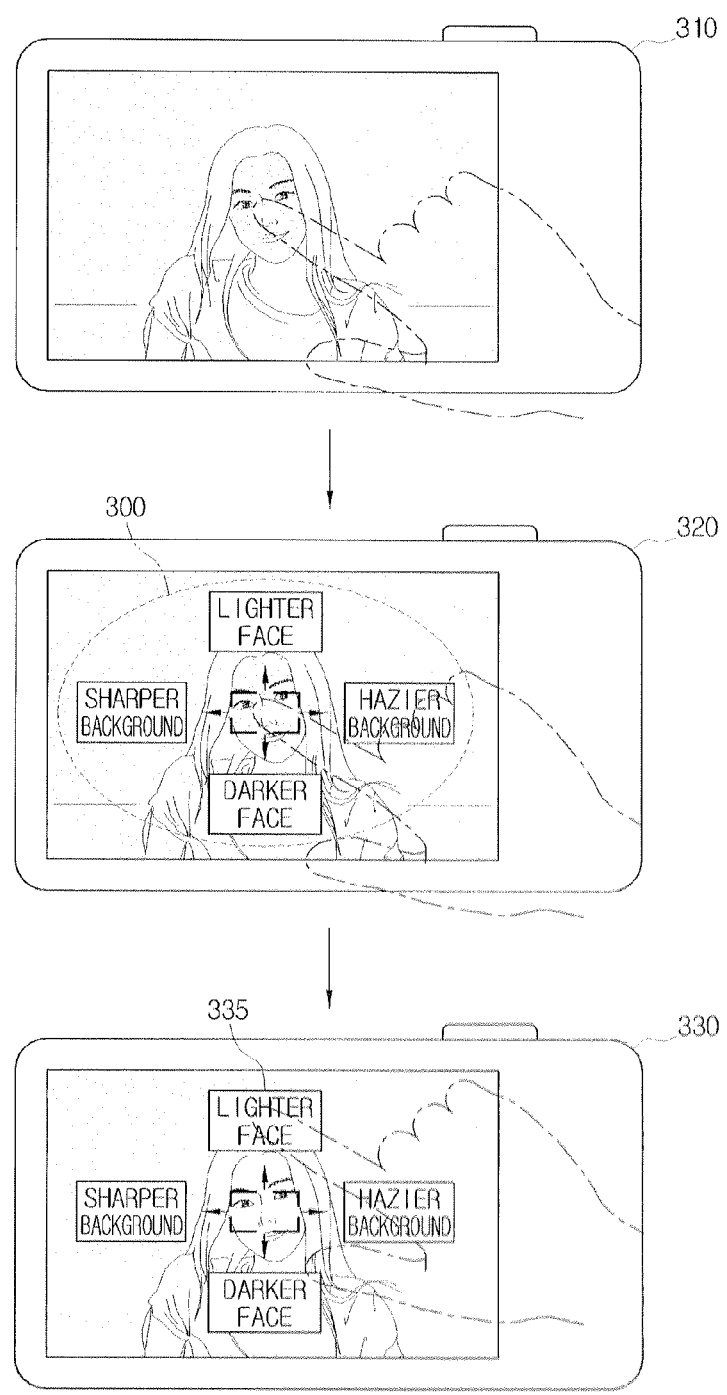
FIG. 3 is a view illustrating a process to select a menu for an image on a specified region according to an exemplary embodiment of the present general inventive concept.

Hereinafter, a specified region menu will be described in detail with reference to FIG. 3. FIG. 3 is a view illustrating a process to select a menu for an image on a specified region according to an exemplary embodiment of the present general inventive concept. FIG. 3 includes screen 3-1 310, screen 3-2 320, and screen 3-3 330.

Screen 3-1 310 illustrates a screen in which an image of a person image to be photographed is displayed on a touch screen 170 and a user touches a region on which a person's face is displayed. When the user touches the person's face, a specified region menu is displayed as illustrated in screen 3-2 320.

Screen 3-2 320 illustrates a screen on which a specified region menu 300 is displayed. The specified region menu 300 includes items such as "lighter face", "darker face", "sharper background", and "hazier background". As illustrated in screen 3-2 320, the specified region menu 300 is displayed above and below, and to the left and right of the position to which the user's touch is input. In this manner, since the specified region menu 300 is displayed on the edge of the position to which the user's touch is input, the user may intuitively know that the specified region menu 300 is a menu related to the image displayed on the touched position.

Figure 15:
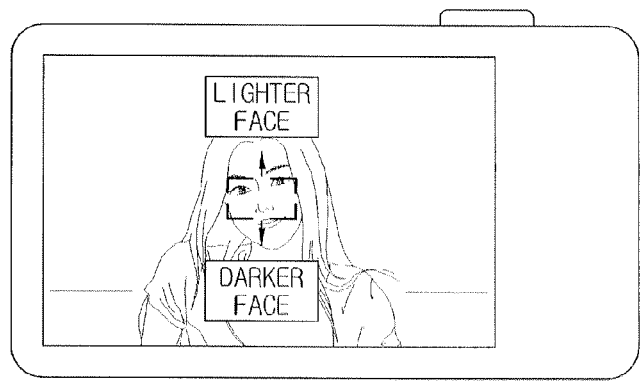
FIG. 15 is a view illustrating a case where a menu has two items according to another exemplary embodiment of present general inventive concept.
Figure 16:
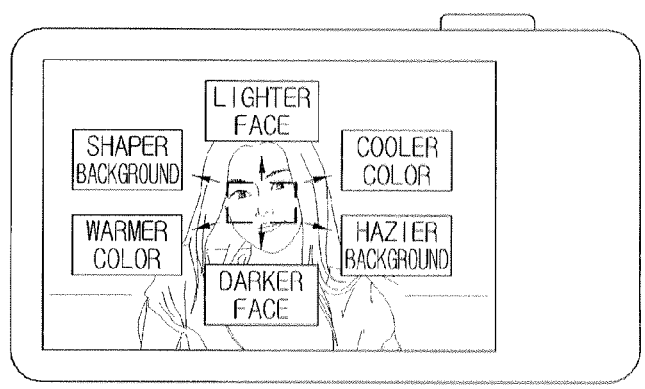
FIG. 16 is a view illustrating a case where a menu has six items according to another exemplary embodiment of present general inventive concept.
Figure 17:
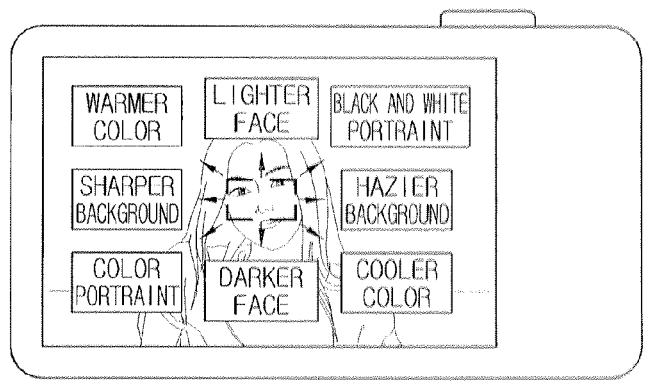
FIG. 17 is a view illustrating a case where a menu has eight items according to another exemplary embodiment of present general inventive concept.

Also, the present embodiment describes the case in which the specified region menu 300 has four menu items, however, a number of menu items may vary. For example, FIG. 15 illustrates a case in which there are two menu items, FIG. 16 illustrates a case in which there are six menu items, FIG. 17 illustrates a case in which there are eight menu items.

Figure 18:
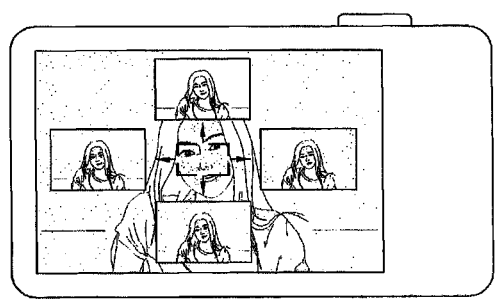
FIG. 18 is a view illustrating a case where items of a menu are displayed as images according to another exemplary embodiment of present general inventive concept.

Also, the present embodiment describes a case in which menu items of the specified region menu 300 are displayed as text in user-friendly language. However, the menu items may be implemented so that result images to which photographic techniques corresponding to the items of the specified region menu 300 are applied are displayed. A screen illustrating this feature is illustrated in FIG. 18.

Screen 3-3 330 illustrates a screen where a menu item 335 "lighter face" is selected from among the menu items of the specified region menu 300. A user touches a region on which the menu items of the specified region menu 300 are displayed, making selecting a desired menu item from the specified region menu 300 possible.

Figure 19:
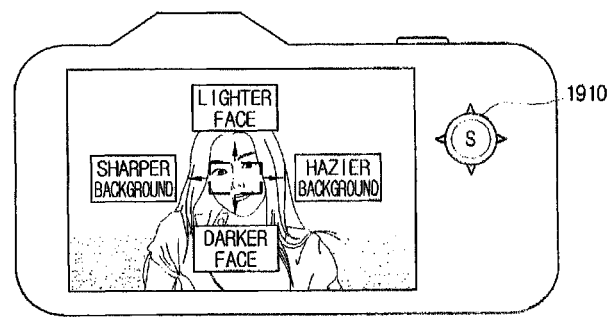
FIG. 19 is a view illustrating a case wherein an operating key is provided to select a menu item according to another exemplary embodiment of present general inventive concept.

Also, the present embodiment describes a case where the menu items of the specified region menu 300 are selected using a touch screen. However, menu items may of course be selected using other operating techniques. For example, as illustrated in FIG. 19, the user may select the specified region menu 300 using a jog shuttle 1910.

In this case, the user specifies the desired region and selects menu items from the specified region menu 300, making selecting photographic techniques to have the desired effect on the desired region possible.

Hereinafter, various methods to determine a specified region will be described with reference to FIGS. 4 to 8.

Figure 4:
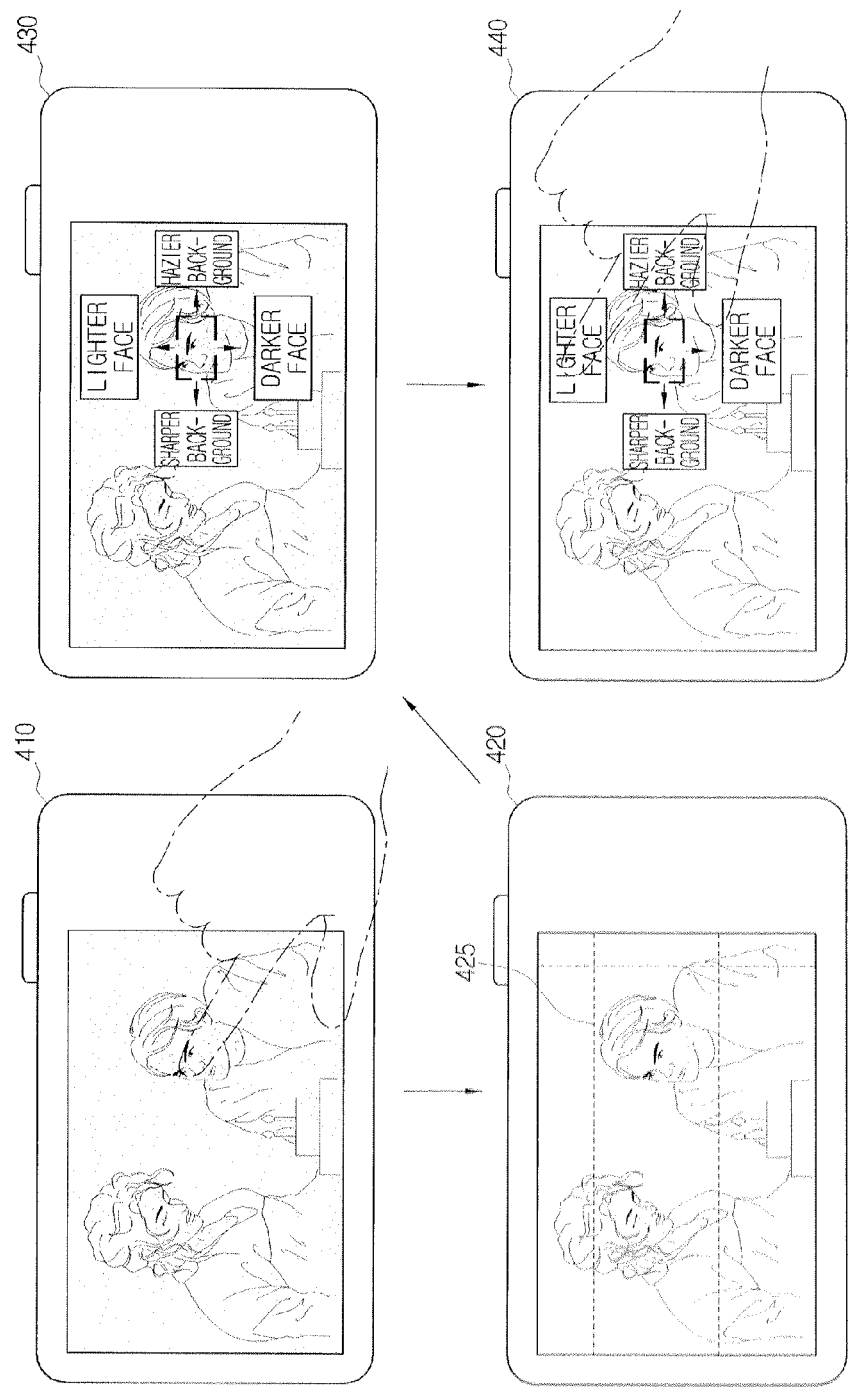
FIG. 4 is a view illustrating a method to determine a region displaying a person's face as a specified region based on the information of a touched position according to an exemplary embodiment of present general inventive concept.

First, referring to FIGS. 1, 4 and 5, a method to determine a specified region based on information of the position touched by a user will be described. FIG. 4 is a view illustrating a method to determine a region displaying a person's face as a specified region based on the information of the touched position according to an exemplary embodiment of the present general inventive concept.

In screen 4-1 410, a user touches a region on which a person's face is displayed on an image displayed on a touch screen 170. When the user touches a certain position on the touch screen 170, the control unit 180 determines a specified region based on the information of the touched position.

Screen 4-2 420 is a screen showing the determination of a specified region 425 is determined. As illustrated in screen 4-2 420, the control unit 180 determines an area ⅓ of the height and ⅓ of a length of the entire image centered on the touched position to be the specified region 425. That is, a rectangle formed by the intersection of the dotted lines in screen 4-2 420 becomes the specified region 425. The dotted lines of screen 4-2 420 may actually be displayed or may not be displayed.

The control unit 180 determines the type of image displayed on the specified region 425. The control unit 180 may determine that a person's face is displayed on the specified region 425 using facial recognition technology. On screen 4-2 420, since the person's face is displayed on the specified region 425, the control unit 180 sets a menu related to the person's face as a specified region menu.

Screen 4-3 430 is a screen on which a specified region menu is displayed. Since the person's face is displayed on the specified region 425, it can be appreciated that the specified region menu of screen 4-3 430 displays a menu related to the person's face including menu items such as "lighter face", "darker face", "sharper background", and "hazier background".

Screen 4-4 440 is a screen on which the user touches and selects the menu item "lighter face". When the user touches a portion of the screen to display the menu item "lighter face", the control unit 180 controls setting values related to photographic techniques in order that the person's face is photographed so as to appear lighter. That is, the control unit 180 controls the person's face displayed on the specified region 425 so that the person's face is photographed so as to appear lighter by controlling setting values related to shutter speed, aperture, or exposure correction. Also, if the user touches the menu item "lighter face" several times, the person's face gradually becomes lighter.

Figure 5:
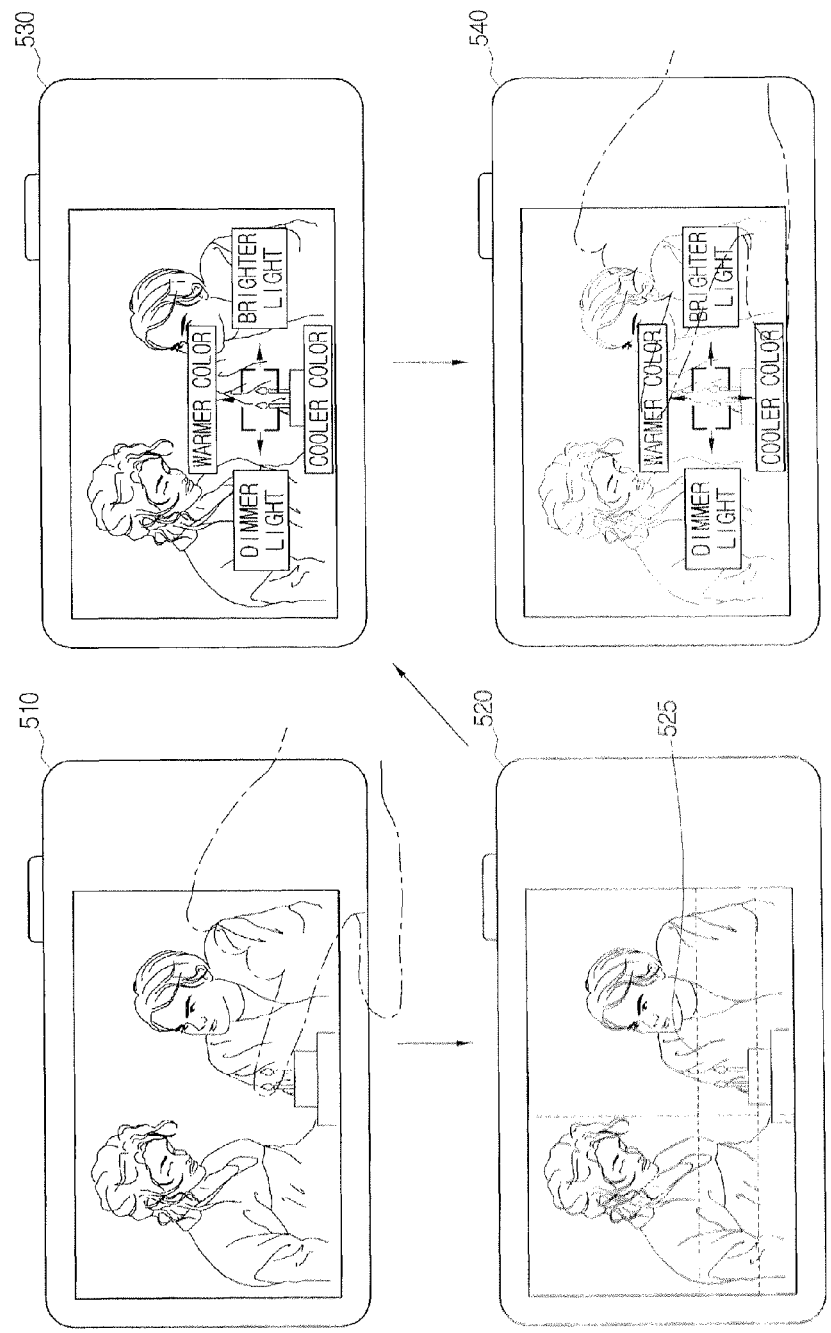
FIG. 5 is a view illustrating a method to determine a region displaying a light region as a specified region based on the information of a touched position according to an exemplary embodiment of present general inventive concept.

FIG. 5 is a view illustrating a method to determine a region on which lights are displayed to be as a specified region based on the information of a position touched according to an exemplary embodiment of the present general inventive concept.

Referring to FIGS. 1 and 5, in screen 5-1 510, a user touches a region on which lights are displayed on an image displayed on a touch screen 170. When the user touches a certain position on the touch screen 170, the control unit 180 determines a specified region based on information of the touched position.

Screen 5-2 520 is a screen illustrating the determination of a specified region 525. As illustrated in screen 5-2 520, the control unit 180 determines an area ⅕ of a height and ⅕ of a length of the entire image centered on the touched position to be the specified region 525. That is, a rectangle formed by an intersection of the dotted lines in screen 5-2 520 becomes the specified region 525. The dotted lines of screen 5-2 520 may actually be displayed or may not be displayed.

The control unit 180 determines the type of image displayed on the specified region 525. The control unit 180 determines that lights are displayed on the specified region 525 using light recognition technology. In screen 5-2 520, lights are displayed on the specified region 525 so that the control unit 180 sets a menu related to lights as the specified region menu.

Screen 5-3 530 is a screen on which a specified region menu is displayed. Since lights are displayed on the specified region 525, it can be appreciated that the specified region menu of screen 5-3 530 displays a menu related to lights including menu items such as "warmer color", "cooler color", "dimmer light", and "brighter light".

Screen 5-4 540 is a screen on which the user touches and selects the menu item "warmer color". When the user touches a portion of the screen to display the menu item "warmer color", the control unit 180 controls setting values related to photographic techniques in order that the lights are photographed so as to appear warmer. That is, the control unit 180 controls the lights displayed on the specified region 525 to be photographed so as to appear warmer by controlling the setting values related to shutter speed, aperture, or exposure correction. Also, if the user touches the menu item "warmer color" several times, the lights are gradually photographed so as to appear warmer.

In this manner, the specified region can be determined based on the position touched by the user.

Figure 6:
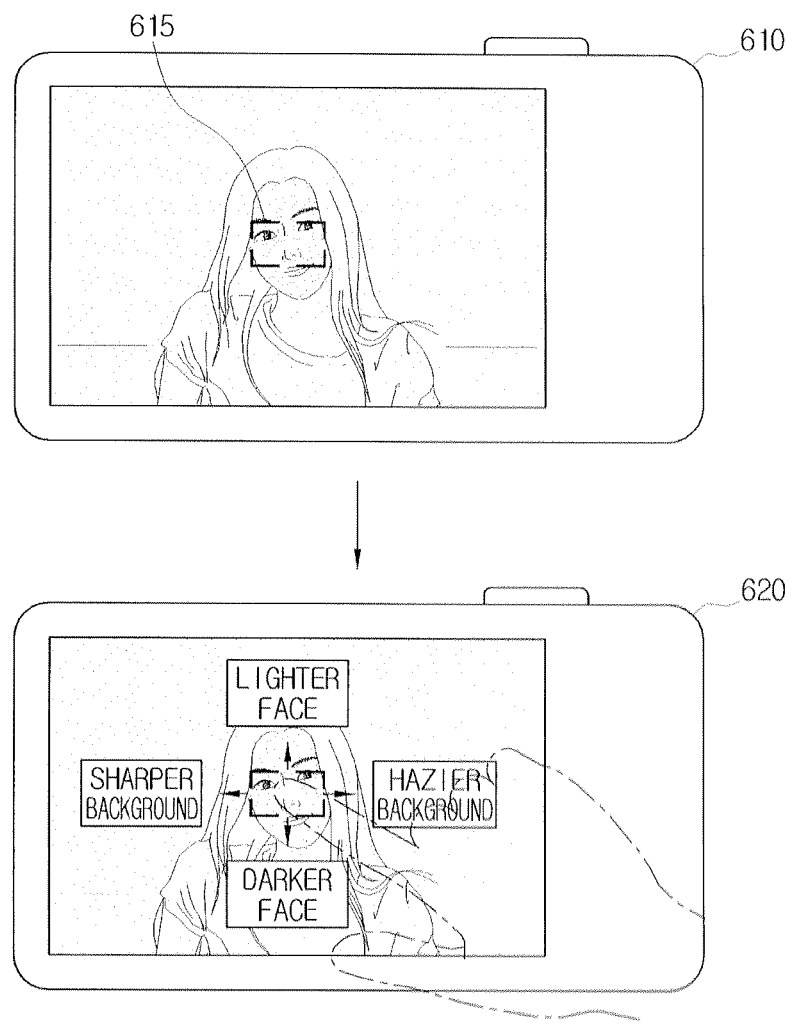
FIG. 6 is a view illustrating a method to determine a region in which a person's face is focused as a specified region according to another exemplary embodiment of present general inventive concept.

Hereinafter, a process to determine a focused region of an image to be photographed to be the specified region will be described with reference to FIGS. 6 and 7. FIG. 6 is a view illustrating a method to determine a region on which a person's face focused is displayed to be a specified region according to another exemplary embodiment of the present general inventive concept.

In screen 6-1 610, a focused region of an image displayed on a touch screen 170 is determined to be a specified region 615. In general, a camera is focused on a center of an image to be photographed so the center of the touch screen 170 is determined to be the specified region 615 in screen 6-1 610.

The control unit 180 determines the type of image displayed on the specified region 615. The control unit 180 determines that a person's face is displayed on the specified region 615 using facial recognition technology. In screen 6-1 610, the person's face is displayed on the specified region 615 so that the control unit 180 sets a menu related to the person's face as a specified region menu.

Screen 6-2 620 illustrates a screen on which a specified region menu is displayed. If a user touches the specified region 615, namely the focused region, the specified region menu is displayed. Since the person's face is displayed on the specified region 615, it can be appreciated that the specified region menu in screen 6-2 620 displays a menu related to the person's face including menu items such as "lighter face", "darker face", "sharper background", and "hazier background".

Figure 7:
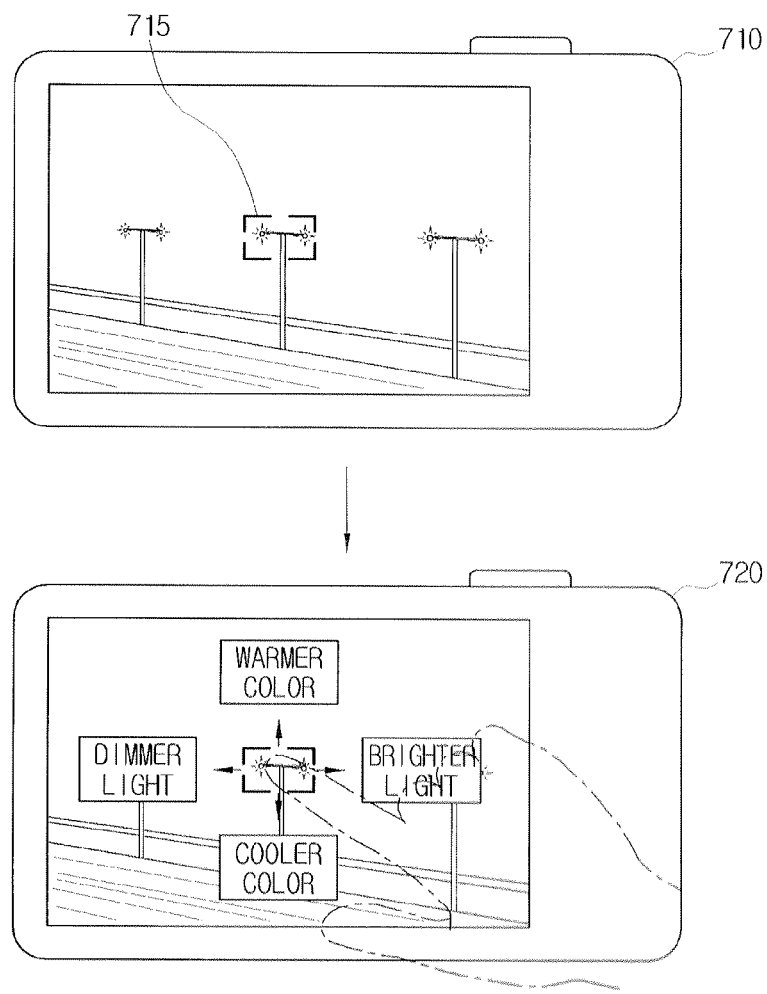
FIG. 7 is a view illustrating a method to determine a region in which a light region is focused as a specified region according to another exemplary embodiment of present general inventive concept.

FIG. 7 is a view illustrating a method to determine a region on which a light region is focused as a specified region according to another exemplary embodiment of the present general inventive concept.

Referring to FIGS. 1 and 7, in screen 7-1 710, a user determines a focused region of an image displayed on a touch screen 170 to be a specified region 715. In general, a camera is focused on a center of an image to be photographed so that the center of the touch screen 170 is determined to be the specified region 715 in screen 7-1 710.

The control unit 180 determines the type of image displayed on the specified region 715. The control unit 180 determines that lights are displayed on the specified region 715 using light recognition technology. In screen 7-1 710, the lights are displayed on the specified region 715 so the control unit 180 sets a menu related to the lights as a specified region menu.

Screen 7-2 720 illustrates a screen on which a specified region menu is displayed. If a user touches the specified region 715, namely the focused region, the specified region menu is displayed. Since the light is displayed on the specified region 715, it can be appreciated that the specified region menu in screen 7-2 720 displays a menu related to the lights including menu items such as "warmer color", "cooler color", "dimmer light", and "brighter light".

In this manner, the control unit 180 can determine the focused region to be the specified region.

Figure 8:
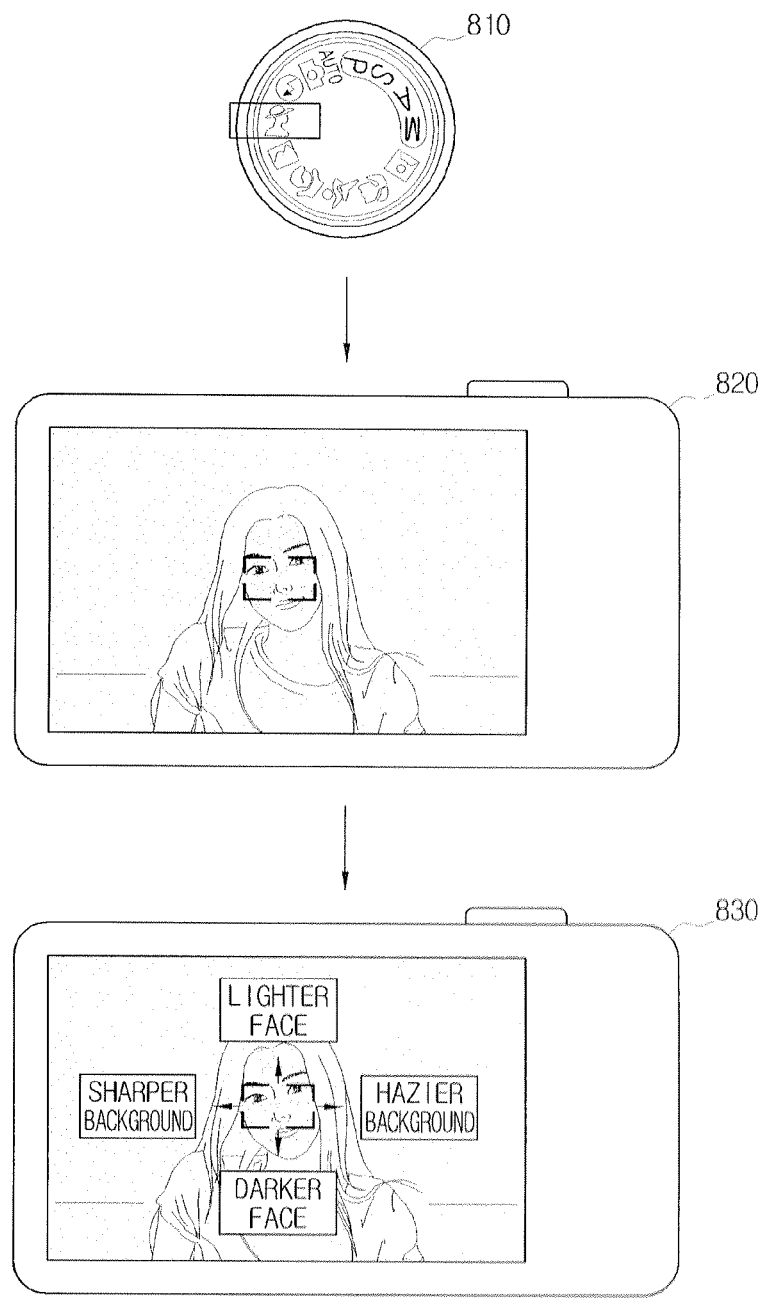
FIG. 8 is a view illustrating a method to determine a region displaying an image related to a photographic mode as a specified region according to another exemplary embodiment of present general inventive concept.

Hereinafter, a method to set a region of image related to a preset photographic mode which is displayed to be photographed as a specified region will be described with reference to FIG. 8. FIG. 8 is a view illustrating a method to set a region displaying an image related to a photographic mode as a specified region according to another exemplary embodiment of the present general inventive concept.

Referring to FIGS. 1 and 8, a photographic mode operating key 810 is set to a portrait mode. When a photographic mode is set to the portrait mode, a control unit 180 determines whether a person's face is included on an image to be photographed. When a person's face is included on an image to be photographed, the control unit 180 sets a region on which the person's face is displayed as a specified region.

Therefore, it can be appreciated that the person's face is set as the specified region in screen 8-2 820. Thereafter, if a user touches the specified region, a specified region menu related to the person's face is displayed, as illustrated in screen 8-3 830.

The present embodiment describes the case in which a photographic mode is set to a portrait mode. However, it can of course be applied to other photographic modes. For example, when a photographic mode is set to a nightscape mode, the control unit 180 may set a region on which light is displayed as a specified region. Also, when a photographic mode is set to a close-up mode, the control unit 180 may set a region on which an object close to the lens is displayed as a specified region.

The region where the image related to the preset photographic mode can be determined to be the specified region through the process as described above.

A process whereby a user selects photographic techniques for an image to be photographed using a specified region menu will be described with reference to FIGS. 1, 9 to 14.

FIG. 9 is a view illustrating a process to select a menu item "lighter face" according to an exemplary embodiment of the present general inventive concept.

First, a user touches a region on which a person's face is displayed, as illustrated in screen 9-1 910. A digital camera then sets a region on which the person's face is displayed as a specified region. Thereafter, as illustrated in screen 9-2 920, a specified region menu for the person's face is displayed on a touch screen 170. As illustrated in screen 9-3 930, a user selects a menu item "lighter face", the digital camera controls the setting value related to photographic techniques in order that the person's face is photographed so as to appear lighter. Through this, as illustrated in screen 9-4 940, it can be appreciated that the person's face displayed on an image to be photographed becomes much lighter. Also, if the user touches the menu item "lighter face" several times, the digital camera controls the setting values related to photographic techniques so that the person's face included on the image to be photographed gradually becomes lighter.

FIG. 10 is a view illustrating a process to select a menu item "hazier background" according to an exemplary embodiment of the present general inventive concept.

Referring to FIGS. 1 and 10, a user touches a region on which a person's face is displayed, as illustrated in screen 10-1 1010. Then, a digital camera sets a region on which the person's face is displayed as a specified region. Thereafter, as illustrated in screen 10-2 1020, a specified region menu for the person's face is displayed on a touch screen 170. As illustrated in screen 10-3 1030, a user selects a menu item "hazier background", and the digital camera controls the setting values related to photographic techniques so that the background of the person is photographed so as to appear hazier. Through this, as illustrated in screen 10-4 1040, it can be appreciated that the background of the image to be photographed is displayed more hazily.

FIG. 11 is a view illustrating a process to select a menu item "brighter light" according to an exemplary embodiment of the present general inventive concept.

Referring to FIGS. 1 and 11, a user touches a region on which light is displayed, as illustrated in screen 11-1 1110. Then, a digital camera sets a region on which the light is displayed as a specified region. Thereafter, as illustrated in screen 11-2 1120, a specified region menu for the light is displayed on a touch screen 170. As illustrated in screen 11-3 1130, a user selects a menu item "brighter light", and the digital camera controls the setting values related to photographic techniques so that the light is photographed so as to appear brighter. Through this, as illustrated in screen 11-4 1140, the digital camera emphasizes rays of light displayed on an image to be photographed so that the light included on the image is displayed so as to appear brighter.

FIG. 12 is a view illustrating a process to select a menu item "cooler color" according to an exemplary embodiment of the present general inventive concept.

Referring to FIGS. 1 and 12, a user touches a region on which light is displayed, as illustrated in screen 12-1 1210. Then, a digital camera sets a region on which the light is displayed as a specified region. Thereafter, as illustrated in screen 12-2 1220, a specified region menu for the light is displayed on a touch screen 170. As illustrated in screen 12-3 1230, a user selects a menu item "cooler color", and the digital camera controls the setting values related to photographic techniques so that color is photographed so as to appear cooler. Through this, as illustrated in screen 12-4 1240, the digital camera controls the color of the light displayed on an image to be photographed to be displayed with a blue-based color (color is not illustrated) so that the light included on the image to be photographed is displayed so as to appear cooler.

Figure 13:
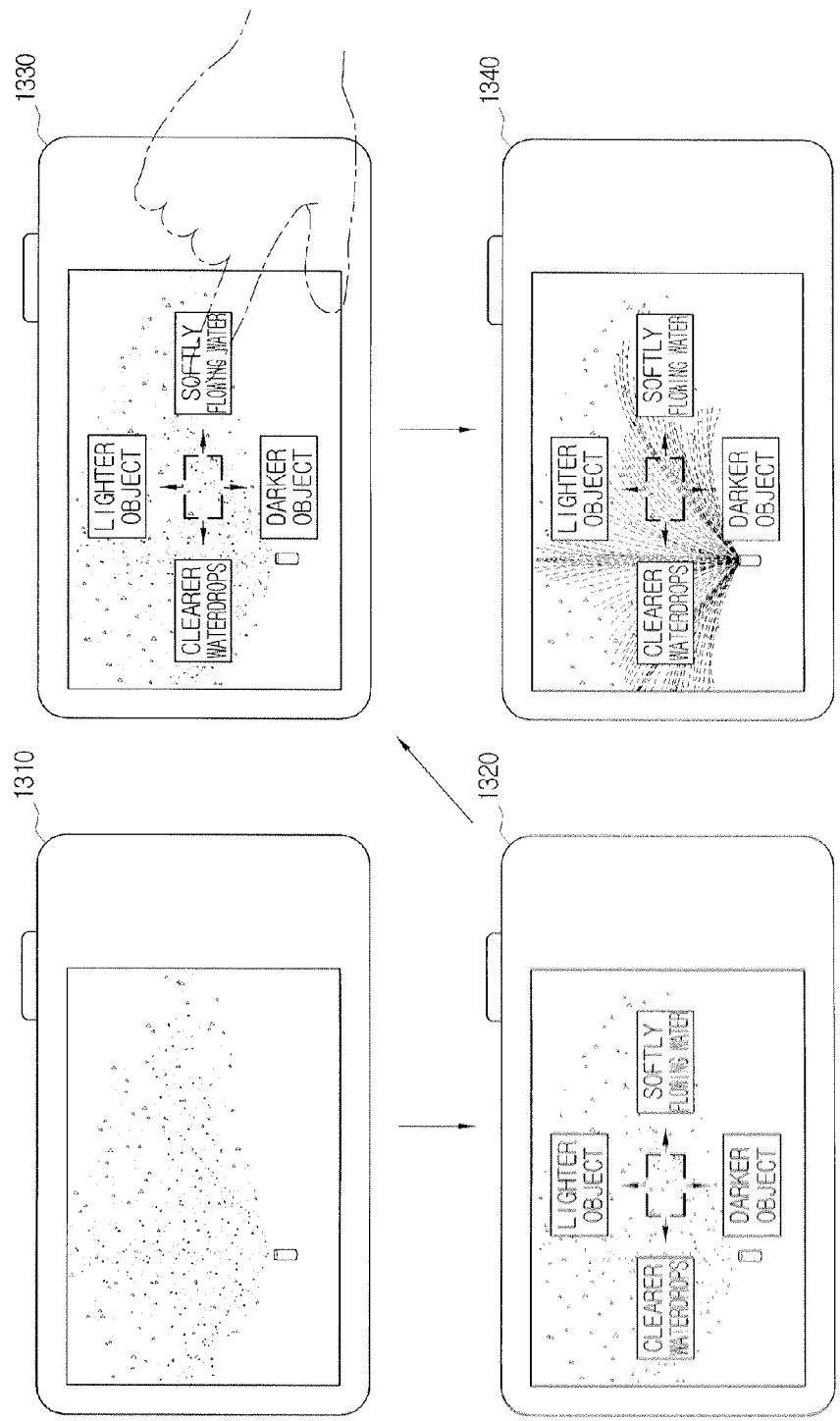
FIG. 13 is a view illustrating a process to select an item "softly flowing water" according to an exemplary embodiment of present general inventive concept.

FIG. 13 is a view illustrating a process to select a menu item "softly flowing water" according to an exemplary embodiment of the present general inventive concept.

Referring to FIGS. 1 and 13, a user touches a region on which waterdrops are displayed, as illustrated in screen 13-1 1310. A digital camera then detects a region on which movement of waterdrops are displayed to set a region on which the waterdrops are displayed as a specified region. Thereafter, as illustrated in screen 13-2 1320, a specified region menu for waterdrops is displayed on a touch screen 170. As illustrated in screen 13-3 1330, a user selects a menu item "softly flowing water", the digital camera controls the setting values related to photographic techniques (for example, controlling the shutter speed value so the image is photographed slowly) so that the water flow is photographed so as to appear softer. Through this, as illustrated in screen 13-4 1340, the digital camera controls the waterdrops displayed on an image to be photographed to be softly connected in order to display the water flow included on the image to be photographed more softly on the touch screen 170.

FIG. 14 is a view illustrating a process to select a menu item "lighter" according to an exemplary embodiment of the present general inventive concept.

Referring to FIGS. 1 and 14, a user touches a background region of an image on which a person is displayed, as illustrated in screen 14-1 1410. In this case, a digital camera cannot determine the type of image displayed on the touched region, so instead the digital camera displays a menu for the entire image to be photographed. Therefore, as illustrated in screen 14-2 1420, the menu for the entire image is displayed on a touch screen 170. The menu for the entire image includes menu items such as "lighter", "darker", "warmer color", and "cooler color". As illustrated in screen 14-3 1430, a user selects a menu item "lighter", the digital camera controls setting values related to photographic techniques (for example, controlling the aperture value so that aperture is opened more widely, controlling the shutter speed value so the image is photographed slowly) in order that the entirety of the image to be photographed is photographed so as to appear lighter. Through this, as illustrated in screen 14-4 1440, the digital camera displays the entirety of the image to be photographed on the touch screen 170 more lightly.

The user may use the specified region menu through processes as described above.

Hereinafter, modified embodiments of the present general inventive concept will be described with reference to FIGS. 15 to 19.

The present embodiment describes the case in which the specified region menu includes four menu items, however, the specified region menu may include various numbers of menu items.

FIG. 15 is a view illustrating a case in which a menu has two menu items according to another exemplary embodiment of the present general inventive concept. As illustrated in FIG. 15, when a specified region menu has two menu items, the two menu items are displayed in upward and downward directions. However, it may of course be implemented so that the two menu items of the specified region menu are displayed in leftward and rightward directions.

FIG. 16 is a view illustrating a case in which a menu has six menu items according to another exemplary embodiment of the present general inventive concept. As illustrated in FIG. 16, when a specified region menu has six menu items, all six menu items are displayed on a frame of the specified region.

FIG. 17 is a view illustrating a case in which a menu has eight menu items according to another exemplary embodiment of the present general inventive concept. As illustrated in FIG. 17, when a specified region menu has eight menu items, the respective menu items are displayed in up, down, left and right directions and in four diagonal directions.

In the present embodiment, the menu items of the specified region menu are displayed as text. However, the menu items of the specified region menu may of course be displayed as images. This is illustrated in FIG. 18. FIG. 18 is a view illustrating a case in which items of a menu are displayed as images according to another exemplary embodiment of the present general inventive concept.

As illustrated in FIG. 18, items of a specified region menu may be displayed as images. Herein, images for each menu item correspond to the images that would result when the photographic techniques corresponding to the respective menu items are applied.

In the case of FIG. 18, an image displayed in the upward direction of the specified region represents an image to which a menu item "lighter face" is applied, an image displayed in the downward direction of the specified region represents an image to which a menu item "darker face" is applied, an image displayed in a leftward direction of the specified region represents an image to which a menu item "sharper background" is applied, and an image displayed in a rightward direction of the specified region represents an image to which a menu item "hazier background" is applied.

As described above, as the images after the photographic techniques are applied to the menu items of the specified region menu are displayed, the user can more easily check the resultant images.

The present embodiment describes the case in which the menu items of the specified region menu are selected by touching the touch screen 170 (FIG. 1). However, they may of course be selected by using other operating keys.

FIG. 19 is a view illustrating a case in which an operating key to select a menu is provided according to another exemplary embodiment of the present general inventive concept. As illustrated in FIG. 19, a user can select menu items of a specified region menu by operating an operating key 1910. For example, in order to select a menu item "lighter face", the user should operate the operating key 1910 in an upward direction, and in order to select a menu item "hazier background", the user should operate the operating key 1910 in a rightward direction.

In this manner, the items of the specified region menu can be selected using various operating keys.

The present embodiment describes the case in which the photographing apparatus is a digital camera. However, the present general inventive concept may of course be applied to other photographing apparatuses. For example, the technical idea of the present general inventive concept may be applied to a camcorder, a cellular phone equipped with a camera, or a PDA equipped with a camera.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

A method to provide a UI to display a menu for an image of a specified region and a photographing apparatus applying the same are provided according to various embodiments of the present general inventive concept, so that a user can easily take high quality photos.

In particular, a menu for photographic techniques for each type of image is displayed on a specified region, so a user can more easily use photographic techniques to obtain desired effects for a desired portion of an image to be photographed.

Additionally, a menu for the photographic techniques is displayed in user-friendly language, in which photographic effects are described so as to be easily understood, so a user can more easily select desired photographic techniques.

Furthermore, a menu for the photographic techniques can be selected and applied before taking a photo, so a user can check a photo to be photographed using selected photographic techniques before taking the photo.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method for providing a graphical user interface in an electronic device, performed by the electronic device, the method comprising:
    displaying an image on a touch display screen of the electronic device;
    receiving a touch input on the touch display screen; and
    superimposedly displaying a plurality of graphical guides of a graphical user interface at a location of the touch input on the touch display screen over the displayed image,
    wherein the displayed plurality of graphical guides vary based on an image characteristic of the displayed photograph image at the location of the touch input such that the plurality of graphical guides correspond to an increase and decrease of at least one visual effect to be applied to at least one portion of the displayed image, wherein the displayed plurality of graphical guides visually illustrate a graphical representation of the increase and decrease of the at least one visual effect to be applied to the displayed image, and wherein the displayed plurality of graphical guides vary such that the plurality of graphical guides are a first plurality of guides if the location of the touch input corresponds to a first region of the displayed photograph image and the plurality of graphical guides are a second plurality guides different from the first plurality of guides if the location of the touch input corresponds to a second region of the displayed photograph image.

2. The method of claim 1, further comprising adjusting the at least one visual effect of the at least one portion of the displayed image corresponding to an increase or decrease of a selected one of the displayed plurality of graphical guides.

3. The method of claim 2, wherein the visual effect is an image color effect, and wherein the adjusting comprises increasing decreasing a warm color effect or a cool color effect to the at least one portion of the displayed image.

4. The method of claim 3, wherein at least one of the displayed plurality of graphical guides visually illustrates an increase or decrease of the image color effect to be applied to the displayed image.

5. The method according to claim 2, wherein at least two of the displayed plurality of graphical guides are associated with tasks, respectively, and the adjusting comprises adjusting the at least one visual effect in accordance with one of the tasks associated with the selected one of the plurality of graphical guides.

6. The method of claim 5, wherein the graphical user interface includes text information associated with the at least one visual effect.

7. The method of claim 6, further comprising varying a number of the displayed plurality of graphical guides based on the image characteristic of the displayed photograph image at on the location of the touch input on the touch display screen.

8. The method of claim 6, further comprising varying a number of text information based on the image characteristic of the displayed photograph image at the location of the touch input on the touch display screen.

9. The method of claim 1, wherein the image characteristic is a color of the photograph image at the location of the touch input.

10. The method of claim 1, wherein the image characteristic is a contrast between the photograph image at the location of the touch input and the photograph image around the location of the touch input.

11. The method of claim 1, wherein the plurality of guides identify a type of object in the photograph image at the location of the touch input.

12. The method of claim 1, wherein the image characteristic indicates one of presence and absence of a background region of the photograph image, and wherein the displayed plurality of graphical guides vary such that the plurality of graphical guides are the first plurality of guides if the location of the touch input corresponds to the presence of the background region at the first region of the photograph image and the plurality of graphical guides are the second plurality of guides different from the first plurality of guides if the location of the touch input corresponds to the absence of the background region at the second region of the photograph image.

13. The method of claim 1, wherein the displayed plurality of graphics guides visually illustrating the increase and decrease of the at least one visual effect to be applied to the displayed image comprise:

a first graphical guide that visually illustrates a first graphical representation of the displayed image having an increase or decrease of a first visual effect among the at least one visual effect; and a second graphical guide that visually illustrates a second graphical representation of the displayed image having an increase or decrease of a second visual effect among the at least one visual effect.

14. A non-transitory machine readable medium storing a program which when executed by at least one processor provides instructions for displaying a graphical user interface in an electronic device, the instructions comprising:

displaying an image on a touch display screen of the electronic device;

receiving a touch input on the touch display screen; and superimposedly displaying a plurality of graphical guides of a graphical user interface at a location of the touch input on the touch display screen over the displayed image, wherein the displayed plurality of graphical guides vary based on an image characteristic of the displayed photograph image at the location of the touch input such that the plurality of graphical guides correspond to an increase and decrease of at least one visual effect to be applied to at least one portion of the displayed image, wherein the displayed plurality of graphical guides visually illustrate a graphical representation of the increase and decrease of the at least one visual effect to be applied to the displayed image, and wherein the displayed plurality of graphical guides vary such that the plurality of graphical guides are a first plurality of guides if the location of the touch input corresponds to a first region of the displayed photograph image and the plurality of graphical guides are a second plurality guides different from the first plurality of guides if the location of the touch input corresponds to a second region of the displayed photograph image.

15. The non-transitory machine readable medium of claim 14, further comprising adjusting the at least one visual effect of the at least one portion of the displayed image corresponding to an increase or decrease of a selected one of the displayed plurality of graphical guides.

16. The non-transitory machine readable medium of claim 15, wherein the visual effect is an image color effect, and wherein the adjusting comprises increasing or decreasing a warm color effect or a cool color effect to the at least one portion of the displayed image.

17. The non-transitory machine readable medium of claim 16, wherein at least one of the displayed plurality of graphical guides visually illustrates an increase or decrease of the image color effect to be applied to the displayed image.

18. The non-transitory machine readable medium according to claim 15, wherein at least two of the displayed plurality of graphical guides are associated with tasks, respectively, and the adjusting comprises adjusting the at least one visual effect in accordance with one of the tasks associated with the selected one of the plurality of graphical guides.

19. The non-transitory machine readable medium of claim 18, wherein the graphical user interface includes text information associated with the at least one visual effect.

20. The non-transitory machine readable medium of claim 19, wherein the method further comprises varying a number of the displayed plurality of graphical guides based on the image characteristic of the displayed photograph image at on the location of the touch input on the touch display screen.

21. The non-transitory machine readable medium of claim 19, wherein the method further comprises varying a number of text information based on the image characteristic of the displayed photograph image at the location of the touch input on the touch display screen.

22. The non-transitory machine readable medium of claim 14, wherein the image characteristic is a color of the photograph image at the location of the touch input.

23. The non-transitory machine readable medium of claim 14, wherein the image characteristic is a contrast between the photograph image at the location of the touch input and the photograph image around the location of the touch input.

24. The non-transitory machine readable medium of claim 14, wherein the plurality of guides identify a type of object in the photograph image at the location of the touch input.

25. The non-transitory machine readable medium of claim 14, wherein the image characteristic indicates one of presence and absence of a background region of the photograph image, and wherein the displayed plurality of graphical guides vary such that the plurality of graphical guides are the first plurality of guides if the location of the touch input corresponds to the presence of the background region at the first region of the photograph image and the plurality of graphical guides are the second plurality of guides different from the first plurality of guides if the location of the touch input corresponds to the absence of the background region at the second region of the photograph image.

* * * * *